[11] 3,620,844

| | | | |
|---|---|---|---|
| [72] | Inventors | Ewald Wicke; Albrecht Kuessner, both of Muenster, Westphalia, Germany | |
| [21] | Appl. No. | 263,379 | |
| [22] | Filed | Mar. 4, 1963 | |
| [45] | Patented | Nov. 16, 1971 | |
| [73] | Assignee | Varta Aktiengesellschaft Frankfurt am Main, Germany Continuation-in-part of application Ser. No. 80,665, Jan. 4, 1961, now abandoned, Continuation-in-part of application Ser. No. 182,247, Mar. 26, 1962, now abandoned. This application Mar. 4, 1963, Ser. No. 263,379 | |

[54] SYSTEM FOR THE ACTIVATION OF HYDROGEN
10 Claims, 11 Drawing Figs.

[52] U.S. Cl. .................................................. 136/86,
  23/210, 55/158, 136/120, 204/290
[51] Int. Cl. .................................................. H01m 27/06
[50] Field of Search ........................................ 136/86,
  120; 204/290; 23/210; 55/158

[56] References Cited
UNITED STATES PATENTS

| | | | | |
|---|---|---|---|---|
| 2,749,293 | 6/1956 | Wahlin | | 204/129 |
| 1,124,347 | 1/1915 | Snelling | | 136/86 |
| 2,913,511 | 11/1959 | Grubb | | 136/86 |
| 3,092,517 | 6/1963 | Oswin | | 136/86 |
| 3,116,170 | 12/1963 | Williams | | 136/86 |
| 3,148,031 | 9/1964 | Vahldieck | | 23/210 |
| 3,148,089 | 9/1964 | Oswin | | 136/86 |

Primary Examiner—Winston A. Douglas
Assistant Examiner—H. A. Feeley
Attorney—Erich M. H. Radde ABSTRACT: A fuel cell comprising an electrode designed for the electrochemical utilization of gaseous hydrogen, said electrode comprising a metallic body of a heavy metal lattice capable of absorbing and diffusing the hydrogen, and at least a large portion of one side of said body being in intimate contact with a dissimilar metal hydrogenation catalyst layer, consisting of a metal hydride, the catalyst of said layer being selected from the group consisting of uranium hydride, titanium hydride, thorium hydride, cerium hydride, and zirconium hydride and the metal of said lattice being selected from the group consisting of tantalum, tantalum alloys, palladium and palladium-silver alloys, and a conduit delivering the gaseous hydrogen to said one side of the metallic body.

PATENTED NOV 16 1971 3,620,844

INVENTORS
EWALD WICKE
ALBRECHT KUESSNER
BY Erich M. W. Radde
AGENT

INVENTORS
EWALD WICKE
ALBRECHT KUESSNER
BY
Erich M. H. Radde
AGENT

SYSTEM FOR THE ACTIVATION OF HYDROGEN

This is a continuation in part application of U.S. applications Ser. No. 80,665, filed Jan. 4, 1961, now abandoned and Ser. No. 182,247, filed Mar. 26, 1962, now abandoned.

The present invention relates to improvements in a system for the activation of gaseous, molecular hydrogen to transform the same to a chemically more active state, and for recovering substantially pure hydrogen from gaseous mixtures and aqueous electrolytes. More particularly, it relates to improvements in metallic electrodes for electrochemically utilizing hydrogen gas.

As is known, a number of metals are capable of absorbing hydrogen with chemical equilibration into their metal lattice. However, the rate of dissolution into the lattice is subject to considerable kinetic impediments. A kinetic resistance to obtain equilibrium at the phase boundary is observed at temperatures below about 200°–300° C. For instance, a measurable reaction between compact tantalum and gaseous hydrogen cannot be observed below 400° C. Similarly high temperatures are required for most of the other metals capable of dissolving hydrogen.

Therefore, auxiliary means had to be used in conventional systems for the chemical activation of gaseous hydrogen for its reaction with these metals when it was not practically feasible to operate at such high temperatures. One such means has been electrolytic precipitation and another one is very high operating pressure. The latter procedure had to be further supported, however, by higher than room temperatures. Obviously, these systems involve complicated and expensive apparatus, which has made the operation in many cases uneconomical.

It is the primary object of the present invention to overcome these disadvantages and to provide a hydrogen activation system which is simple and correspondingly inexpensive.

It is another object of the present invention to provide improved metallic electrodes for the electrochemical conversion of hydrogen gas and to reduce the kinetic resistance of the hydrogen flow into the metal.

It is a further object of the present invention to provide improved metallic electrodes for the electrolytical production of pure hydrogen gas.

The present invention is based on the discovery that the kinetic impediment of dissolving hydrogen into and recovering hydrogen out of continuous metal lattice is unexpectedly reduced by a considerable degree if the surface of said metal lattice is so disrupted that it defines a multitude of crevices or rifts of molecular dimensions wherethrough the hydrogen rapidly moves into the metal lattice. As used throughout the specification and the claims the terms "adsorbing" and "chemisorbing" are considered to be equivalent, as well as the terms "absorption" or "dissolution."

Metallic hydrogenation catalysts are well known and a rather complete list thereof is available, for instance, in the catalogue published in Frankfurt/Main, Germany, by the Deutsche Gold-und Silberscheideanstalt. As used throughout the specification and the claims, the terms "hydrogenation catalyst" or "catalyst" include all such catalysts which are capable of chemisorbing or adsorbing hydrogen, including platinum, palladium, nickel, cobalt, iron, copper, and alloys thereof, various metallic hydrides, such as the hydrides of uranium, thorium, cerium and titanium, semiconductor material, such as n-type silicon, and others, but excluding, for instance, lead or silver.

Preferred hydrogen-adsorbing catalyst layers for activating the surface of the continuous metal lattice, which receives the hydrogen, are metallic powders, such as iron, cobalt, nickel, and copper, as well as their alloys, and the Raney form of these metals. For instance, finely comminuted iron or cobalt powders obtained by the reduction of their respective oxides are useful for this purpose.

The hydrogen-activation system of the present invention accordingly includes a continuous metal lattice capable of dissolving gaseous hydrogen in intimate contact with a porous layer of a hydrogen-adsorbing material. The layer must define a multitude of crevices, fissures, or rifts of molecular size. They may both consist of foils or sheets, in which case they are pressed together into intimate contact but spaced at least partially so as to define crevices, fissures, or rifts of molecular size therebetween. Preferably, however, the layer will consist of a powder or porous body of the catalyst covering a plane surface of the hydrogen-dissolving metal lattice foil or sheet.

When the system is used for fuel cell electrodes, preferred electrodes include the systems of palladium-uranium hydride, palladium-titanium hydride, palladium-silver alloy-uranium hydride, palladium silver alloy-titanium hydride, and palladium silver alloy combined with palladium, platinum, or Raney metals of nickel, copper, iron, or cobalt.

The intimate surface contact may be accomplished according to the invention by pressing the metal hydride powder or hydrogenation catalyst powder on the metal surface or by coating a portion or all of the metal surface with a hydride-forming metal and converting said metal into its hydride. Another useful method consists of sintering a hydride-forming metal powder or the hydrogen-adsorbing metal powder on the surface of the metal lattice or pressing or rolling the sintered powder layer into the surface.

It is also possible to use a porous body, such as Kieselguhr, as a carrier for the hydrogenation catalyst. For instance, a kieselguhr body may be impregnated with a nickel or copper salt solution and, after drying, the nickel or copper salt may be reduced to metallic nickel or copper in a hydrogen atmosphere at elevated temperatures. The resultant powder will consist of porous particles coated with crystals and crystallite aggregates of the hydrogenation catalyst, the matrix or the porous body consisting of inert material.

Preferred metals for the dissolution of the hydrogen as well as for the evolution of absorbed hydrogen, include palladium and palladium alloys, preferably palladium-silver alloys containing 25 percent or 30 percent of silver, for instance, as well as tantalum and its alloys.

The system of the present invention may be used in a number of otherwise conventional processes and reactions as, for instance, in 1. fuel cells, as hydrogen electrodes; in
2. the separation of hydrogen into its isotopes, either in a continuous or in a batch process; or in
3. the purification of gaseous hydrogen by removing therefrom gaseous impurities.
4. the production of absolutely pure hydrogen, preferably by electrolysis.

The above and other features and aspects of this invention will be more fully understood when considered in the light of the following specific examples, taken in conjunction with the accompanying drawings, which, however, in no way limit the invention.

Figure 9:
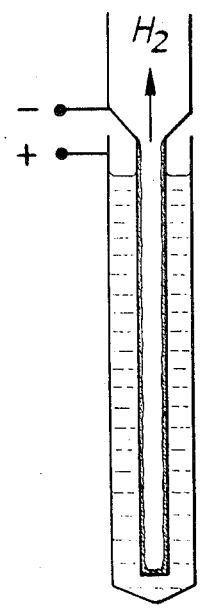
Figure 10:
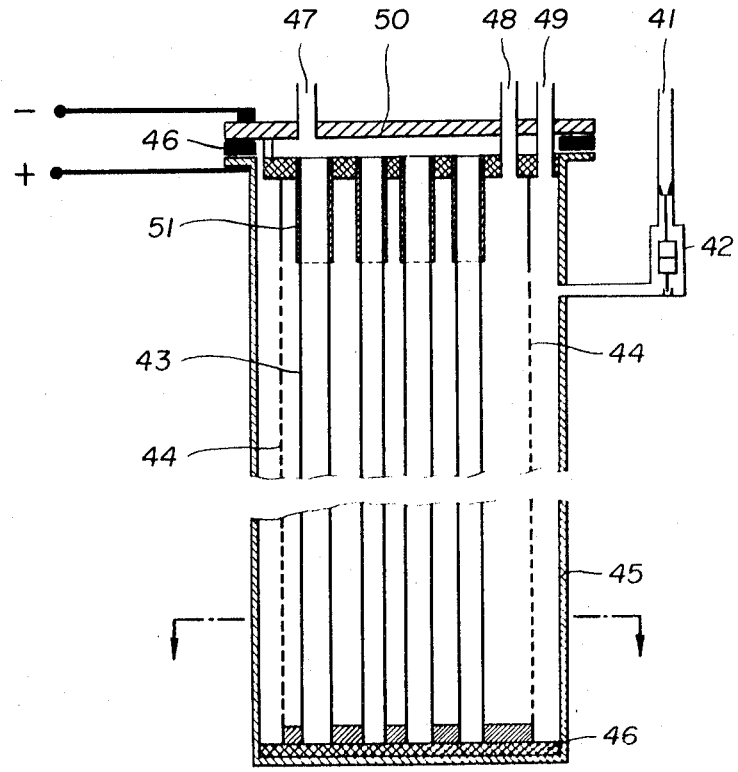
Figure 11:
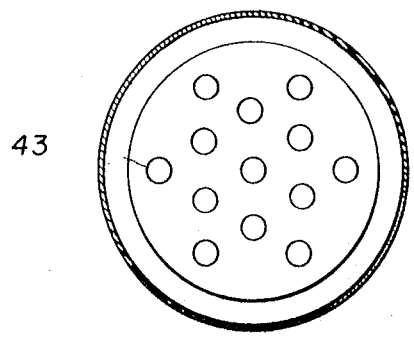

FIG. 9, 10, and 11 show two types of an apparatus for the production of pure gaseous hydrogen by electrolysis.

EXAMPLE 1

This simple test shows how the creation of crevices, fissures, or rifts of molecular dimensions improves the rate of hydrogen dissolution in a continuous metal lattice capable of dissolving gaseous hydrogen.

Figure 1:
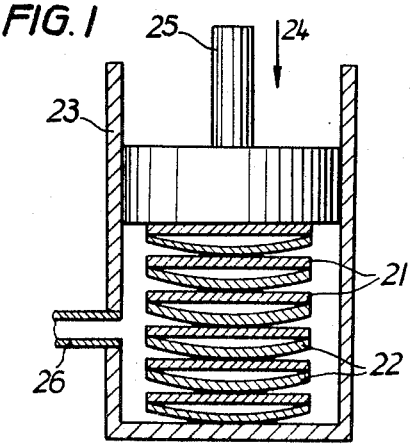
FIG. 1 shows a test apparatus.

A column of 12 discs of a palladium-silver alloy composed of 70 percent palladium and 30 percent silver were placed in a tube 23 as shown in FIG. 1. As illustrated, alternate discs 21 were flat, i.e. had plane surface, while interleaved discs 22 were concave or dished. The discs had a diameter of 7 mm. and a thickness of 0.2 mm. having a resiliency similar to steel.

Gaseous hydrogen was supplied to the apparatus through the side-inlet 26 and a vertical pressure in the direction of arrow 24 was applied to the discs by piston 25, thus forming further crevices or spacings of molecular dimensions between adjacent disc surfaces, the exact dimensions obviously varying with the applied pressure.

Figure 2:
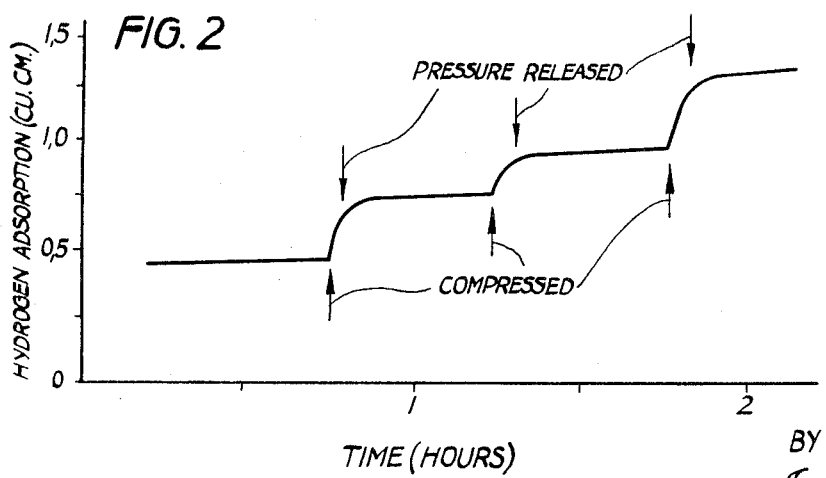
FIG. 2 is a graph recording the test results with the apparatus of FIG. 1.

The hydrogen dissolution rate was measured with a gas buret and the results were recorded in the graph shown in FIG. 2, the hydrogen pressure being 760 torr. and the temperature 26° C. While one ordinate of the graph shows the hydrogen absorption in cubic centimeters, the other ordinate shows the time in hours. The curve shows the sudden increase in absorption each time pressure is applied on the column of discs while the absorption curve flattens out promptly upon relaxation of the pressure.

EXAMPLE 2

A palladium wire of 0.05 mm. thickness was mounted in a hermetically sealed glass envelope and was brought into contact with uranium hydride powder, $UH_3$, which was prepared in the same envelope. Then hydrogen gas was admitted at 23° C. and at a pressure of 580 mm. Hg. Within about 10 seconds, the palladium wire was saturated with hydrogen.

EXAMPLE 3

Figure 3:
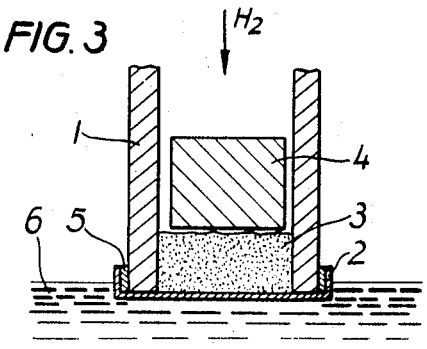
FIG. 3 shows a fuel cell electrode.

Referring to FIG. 3, a hydrogen electrode for a fuel cell was made by soldering palladium foil 2 of 0.1 mm. thickness, 5 indicating the solder, to one open end of an open-ended tube of 8 mm. diameter. Tube 1 was made of german or nickel silver (an alloy of 60 parts of copper, 30 parts of nickel, and 30 parts of zinc). A layer 3 of Raney nickel powder of 3 mm. thickness was placed on the palladium foil 2 in the interior of the tube and intimate contact between the Raney nickel powder layer 3 and the palladium foil 2 was assured by placing an iron weight 4 of 10 g. weight upon the powder layer.

The electrode was immersed, as shown in FIG. 3, in a 6N sodium hydroxide solution electrolyte 6 so that the palladium foil 1 was in contact with the electrolyte 6. The surface of the palladium foil 1 in contact with the electrolyte 6 was 0.5 sq. cm. and an iron sheet of about 20 sq. cm. surface served as counterelectrode (not shown).

The intimate contact between the catalytic layer 3 and the metal foil 2 may be obtained by any suitable means, of course. For instance, it would be possible to press the layer 3 against the foil 2 by means of a suitable wire mesh. In the illustrated embodiment, the intimate contact was produced in hydrogen atmosphere wherein the iron weight was lifted by magnetic force and then dropped onto the catalytic powder layer. This procedure was repeated several times to obtain the desired intimate contact. The inert atmosphere was used because Raney nickel is pyrophoric and would be inactivated or even consumed by the oxygen in the air.

The same tubular electrode was used but the foil 2 consisted of palladium-silver alloy (75:25) and the Raney nickel layer 3 was replaced by a layer of uranium hydride ($UH_3$) or a layer of Raney iron, Raney cobalt or Raney copper.

Figure 4:
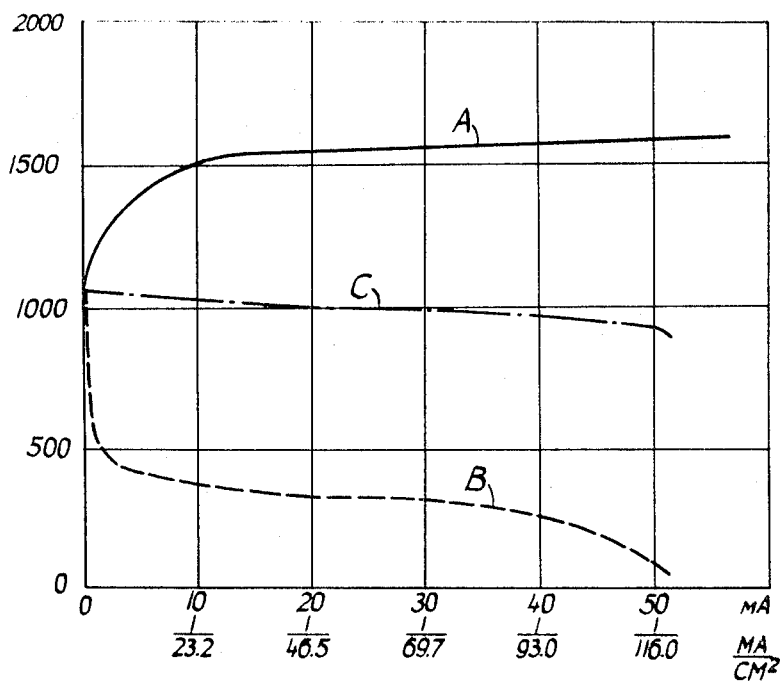
FIG. 4 is a graph showing the operation potential of the electrode of FIG. 3.

FIG. 4 shows a graph indicating the electrode potential in dependence on the load, measured at 25° C. in a 6N sodium hydroxide electrolyte against a saturated calomel test electrode. Curve A shows the result with a cathodic load and curve B gives the result with an anodic charge, with the outer surface of the palladium-silver foil being polished in each case. The best results are shown in curve C where the palladium-silver-foil was platinized at the outer surface prior to measurement. The values plotted in FIG. 4 were obtained with a layer of uranium hydride as hydrogen-adsorbing catalyst; compara- ble results were measured when the layer of uranium hydride was replaced by Raney iron, Raney cobalt or Raney copper.

Comparable results were obtained when the uranium hydride was replaced by titanium hydride, thorium hydride, and cerium hydride.

EXAMPLE 4

Figure 5:
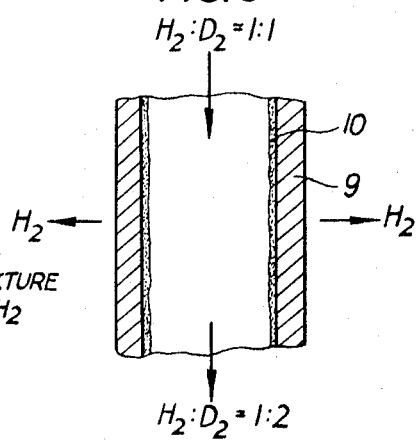
FIG. 5 shows a hydrogen-deuterium separation system.

FIG. 5 shows a continuous system of the separation of a hydrogen-deuterium mixture. In this system, tube 9 consisting of a palladium-silver alloy (containing 25 percent of silver) carries liner 10 of powdered Raney cobalt. When the hydrogen-deuterium gaseous mixture (1:1) is fed into the tube, the Raney cobalt will cause the hydrogen component to be preferably absorbed by the palladium alloy tube. The hydrogen is removed from the tube either electrolytically or by a reduced pressure applied to the outside wall of the tube so as to prevent saturation of the metal with dissolved hydrogen. If reduced pressure is used, the hydrogen must be activated at the outside wall of the tube, too, by coating the wall with Raney cobalt, for instance, similarly to the inside wall. As a result of the preferred constant removal of hydrogen from the mixture in the tube, a deuterium-enriched gaseous mixture will emerge at the end of the tube, the $D_2$ enrichment depending on the temperature, the length of the tube, and the speed of flow of the gas mixture.

It is possible, of course, to use the systems of FIG. 5 in known cascading and countercurrent arrangements so that a plurality of individual separators may be combined to multiply the effectiveness of the operation.

In the separation of hydrogen isotope, the operation of the system at room or even considerably lower temperatures is particularly useful because the separation effect, i.e. the ratio of the mixture at the entry and exit of the system, is greatly dependent on the temperature. This ratio improves with decreasing temperatures, i.e. the effectiveness of the separation increases at low temperatures.

For instance, in a gas-chromatographic batch system with a palladium black column the separation factor is 1.5 at 60° C., 1.8 at 20° C., 2.1 at 0° C., 2.8 at −40° C., and 4.25 at −78° C. (E. Glueckauf and G. P. Kitt, Symposium on Vapor Phase Chromatography, London, 1956).

EXAMPLE 5

Figure 6:
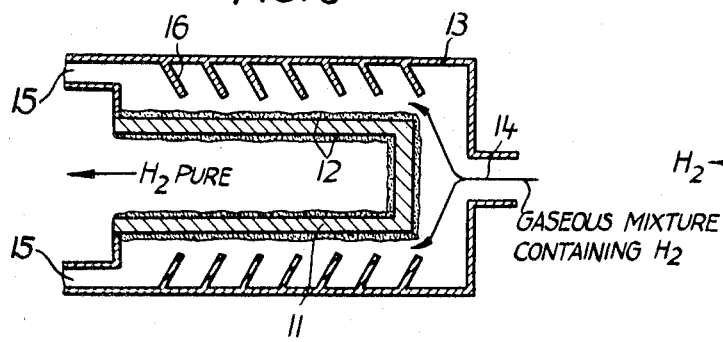
FIG. 6 shows a hydrogen separation system.

The system of FIG. 6 is used to obtain pure hydrogen from a gaseous mixture containing hydrogen and other gases. In this system, a hydrogen separator unit is built into a container 13 having an inlet 14 through which the gaseous mixture is fed. The hydrogen separator unit consists of a tube 11 which is closed at one end and the open end of which passes through a container wall so that pure hydrogen emerging from the interior of the tube may be collected from this open end. The tube 11 consists of the same palladium alloy as used for tube 9. The exterior as well as the interior walls of the tube are lined with a copper powder layer 12. The pressure within the tube is atmospheric while the gaseous mixture is fed into container 13 at such a rate as to produce an approximate pressure of 20 atm. within the container. Through the selective adsorption and solution of hydrogen in the separator unit, pure hydrogen will emerge from the interior of the tube while the remainder of the gaseous mixture is removed from the container through outlets 15. Obliquely arranged blades 16 may cause a turbulence in the in-flowing gaseous mixture so that all of the hydrogen is brought into contact with the tube.

Any deuterium in the hydrogen will diffuse through the wall of said tube more slowly than hydrogen so that the gaseous mixture removed from the container will be enriched with deuterium while the emerging hydrogen will have a smaller deuterium component.

It may be mentioned that the copper powder layer 12 is highly indifferent to water, nitrogen, and carbon monoxide. It reacts, however, with oxygen and thus gradually becomes inactivated. It can be reactivated in a simple manner by heating tube 11 to a temperature between about 110° C. and about 200° C. in a hydrogen stream.

When using technical grade hydrogen, it is the preferred procedure to effect its purification at a temperature between about 150° C. and about 200° C. thereby insuring continuous reactivation of the catalyst during purification of the hydrogen. Such a temperature is still considerably lower than when employing palladium or said palladium-silver alloy with polished surfaces alone without catalyst powder layer according to the present invention because under such conditions the temperature must be between 400° C. and 500° C.

EXAMPLE 6

Hydrogen of the highest degree of purity was recovered continuously and in almost theoretical yields by using the system of the invention as a cathode in a 6N sodium hydroxide electrolyte. The system comprised a 90 mm. long tube of 3 mm. diameter and a wall thickness of 0.1 mm., the tube being made of palladium-silver alloy 3:1. The tube was closed at the bottom by the same hydrogen dissolving metal and filled with uranium hydride ($UH_3$) powder. The apparatus which was used for the described example is shown schematically in FIG. 9 which is self-explanatory. Similar results were obtained, when the inside of the tube was covered by a porous palladium or platinum layer.

A laboratory apparatus for the continuous production of high-purified hydrogen or deuterium is shown in FIG. 10 and consists principally of several palladium-silver-alloy tubes, which are in contact with the electrolyte consisting of alkaline aqueous solutions. The counterelectrode is the container wall or a platinum sheet covering the inside of the container. If a palladium-silver alloy (75:25) is used which has a tensile strength of 55 kp./mm. tubes with a diameter of 0.5 cm. and a wall thickness of 0.01 cm. can therefore resist against an inner pressure of $$p_i = \frac{K_z \cdot s}{5r_i} = \frac{1100 \cdot 0{,}01}{0{,}24} = 45{,}8 \text{ atmos.}$$

considering a safety factor of 5.

In this equation $p_i$ means inner pressure in atmospheres, $K_z$ is the tensile strength in kp./cm.$^2$, $s$ is the wall thickness in cm., $r_i$ is the inner radius of the tubes in cm.

In particular in FIG. 10 41 illustrates the input of water of heavy water, 42 is the input-regulating device for water or heavy water respectively, especially for continuous operation. 43 demonstrates the palladium-silver tubes which are reinforced by silver tubes 51 at the upper end. The palladium silver tubes which serve as cathodes are isolated against the anode 45 by plastic plates 46. A separator 44 prevents the anodically evolved oxygen from entering to the cathode. 47 is the output for high-purified hydrogen and 48 is the output for the unabsorbed cathode hydrogen. The oxygen escapes through the output 49. 50 illustrates a metal cover with a chamber to collect the purified hydrogen. The apparatus contains a total of 13 palladium-silver tubes which are, as shown in the graph, arranged symmetrically. The active surface of the cathodic acting tubes is 0.10 qm. Compared with the diagram FIG. 7 the described apparatus produces high-purified hydrogen in the quantity of 0.105 l./min., if an electrolysis current of 15 a. flows. On the other hand a current of 50 a. will produce 0.29 l./min. considering a yield of 83 percent corresponding to the theoretical value.

When this apparatus is set into operation the evolved hydrogen is quantitatively absorbed by the palladium-silver tubes and desorbed at the inner side of the palladium black activated tubes. If the higher electrolysis current density is increased some hydrogen will evolve at the outside of the tubes. This hydrogen can be collected and used like normal electrolysis hydrogen.

It is advantageous to collect the high-purified hydrogen under pressure and to regulate the pressure and the water inflow by an automatically acting switch for the electrolysis current.

Preferably this apparatus can be used for the production of high-purified deuterium. In this case well-dried potassium carbonate is dissolved in the heavy water which serves as electrolyte. The yield was only a little lower in comparison to the hydrogen yield at similar conditions. It is possible to work with very small quantities if the apparatus container is suitably deviated. As shown above the purified hydrogen or deuterium can be collected immediately under pressure with only small loss of yield. An inner hydrogen pressure of 40 atmos. will cause some rediffusion to the outside of the tubes, being without load, but this can be compensated by a current of only 1.9 a.

Figure 7:
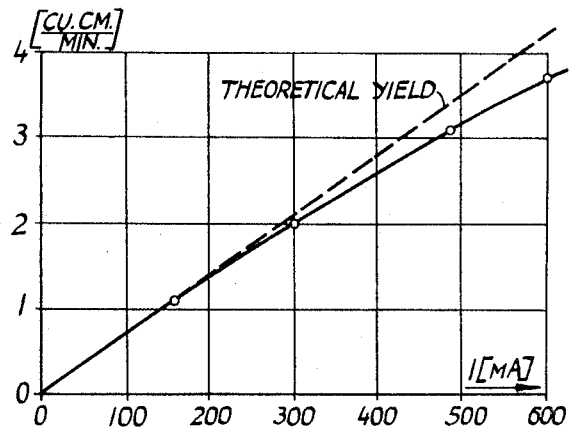
FIG. 7 is a graph showing the hydrogen evolution in one system of the invention.

FIG. 7 shows the hydrogen evolution in dependency on the applied amperage, when using one tube only as shown in FIG. 9. With an amperage of 150 ma. a pressure of 760 torr. and a temperature of 26° C. the hydrogen yield shown by the curve in full lines is almost theoretical (broken line curve).

It will be obvious from the above description that the system of hydrogen activation through a fissured surface may be used for any purpose where such activation is desired and has the considerable advantage of making efficient operation at room and lower temperatures feasible.

The system according to the present invention has proved to be of considerable value in the elimination of impurities from hydrogen as supplied in steel flasks. It can also advantageously be employed for separating hydrogen from other gases. For instance, the hydrogen component present in illuminating gas which contains many other gases such as lower saturated or unsaturated hydrocarbons, nitrogen, carbon monoxide, and others, is readily separated from such other gases. Likewise, it is possible to recover hydrogen from natural gas that has been subjected to a cracking process in order to produce hydrogen therefrom. When using palladium or a palladium alloy, only hydrogen is dissolved therefrom and passes therethrough. Thus, it is possible to recover hydrogen of a purity of 99.999 percent in a simple manner and without difficulties even if the starting gas contains only 2 percent to 5 percent of hydrogen. Hydrogen diffuses already at room temperature and even at a temperature of −78° C. through the rift surface system according to the present invention.

It has been found, for instance, that a palladium sheet will react with gaseous hydrogen even at a temperature as low as −78° C. when in contact with uranium hydride. Similar results have been obtained with the other systems named hereinabove.

Of course, it is advisable to remove hydrogen sulfide, carbon disulfide, or other volatile sulfur compounds forming hydrogen sulfide at the surface of the catalyst or palladium from the starting gas by known means because such hydrogen sulfide has an irreversible deactivating, poisonous effect on the catalyst and the hydrogen absorbing metal.

In these systems, the speed at which the equilibrium between absorbed hydrogen and gaseous hydrogen is established, is determined by the transport of hydrogen atoms by diffusion from the surface into the metal body. In the heavy metals named above the diffusion coefficient for hydrogen is relatively large. Thus the hydride contact facilitates the transport of the gas into the metal lattice, the hydrogen may be delivered on one surface into the metal lattice and electrochemically used on the opposite surface thereof.

If a mixture of different hydrogen isotopes is used, this reaction also permits a change in the concentration useful, for instance, for enriching one isotope since their diffusion speeds differ.

EXAMPLE 7

A palladium metal foil of 0.1 mm. thickness was brought into contact with uranium hydride powder on one side by pressing the powder on the metal surface, 0.5 g. of uranium hydride powder being used per sq.cm. of surface. The uncovered side of the palladium foil was contacted with an electrolyte, while gaseous hydrogen under a pressure of 1 atmosphere was delivered to the hydride-covered side of the foil. The hydrogen was almost quantitatively electrochemically usable. The effectivity of this electrode was 1.75 cc. of hydrogen at standard conditions per sq.cm. of electrode surface and minute, or 250 ma./sq.cm. at room temperature.

EXAMPLE 8

The palladium metal foil of example 7 may be used as a hydrogen electrode with nearly the same effectivity if covered with a layer of finely grained titanium hydride instead of uranium hydride.

EXAMPLE 9

A tube of palladium-silver alloy (75:25) having an inner diameter of 3 mm. and being closed at one end was filled with uranium hydride powder or Raney copper, nickel, cobalt, or iron powder which was brought into contact with a hydrogen gas supply at room temperature. The tube was rapidly charged with hydrogen and then immersed into an alkaline electrolyte, where it was used as a hydrogen electrode. The electrode potential of different current densities are shown in FIG. 4.

Similar results were obtained with such a palladium-silver alloy tube electrode, the inner surface of which was covered by a porous palladium or platinum layer. These layers were not affected by air or other gases except volatile sulfur compounds. Such electrodes thus are especially suitable for technical use because their layers are not pyrophoric as metal hydride layers.

Figure 8:
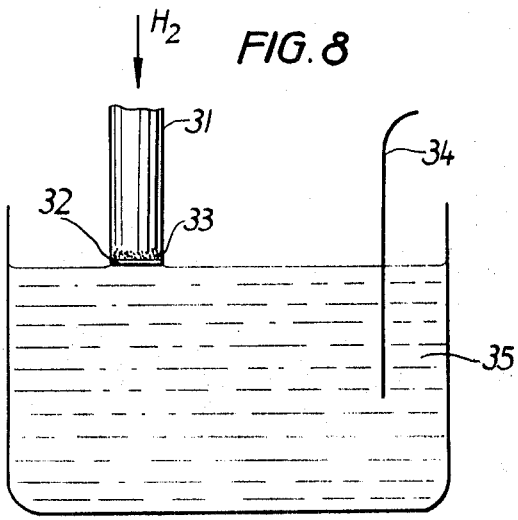
FIG. 8 shows a fuel cell with a schematically illustrated oxygen electrode.

In FIG. 8 31 indicates a tube as shown in FIG. 3 and described in example 3 as a conduit for the delivery of hydrogen gas to the electrode metal lattice 32 which is illustrated as a flat bottom of this tube. This bottom consists of a heavy metal, preferably palladium or a palladium alloy, which absorbs and diffuses hydrogen to activate the same in an electrochemical process for producing electric current. The upper surface of this bottom, which receives the hydrogen gas supply, is in contact with a layer of metal hydride powder 33, which has been shown with much exaggerated thickness for the sake of clarity. 34 is the schematically illustrated counterelectrode (e.g. the oxygen electrode), 35 an alkaline electrolyte, for instance, 2n KOH. Instead of coating the metal lattice 32 mechanically with a metal capable of adsorbing hydrogen it is preferred to deposit a thin metallic film with rifts of molecular size by known chemical means.

While the invention has been described in connection with certain preferred embodiments, it will clearly be understood that many modifications and variations may occur to the skilled in the art, particularly after benefiting from the present teaching, without departing from the spirit and scope of the invention as defined in the appended claims.

We claim:

1. In a system for the chemical activation of gaseous hydrogen, a continuous metal lattice capable of dissolving gaseous hydrogen, and dissimilar metal hydrogenation catalyst layer in intimate contact with said continuous metal lattice, said catalyst layer defining a multitude of crevices of molecular size, the catalyst of said layer being selected from the group consisting of uranium hydride, titanium hydride, thorium hydride, cerium hydride, and zirconium hydride and the metal of said lattice being selected from the group consisting of tantalum, tantalum alloys, palladium and palladium-silver alloys.

2. In the system of claim 1, wherein the continuous metal lattice is a pore-free metal sheet.

3. In the system of claim 1, wherein the metal lattice is selected from the group consisting of palladium and palladium-silver alloys.

4. In the system of claim 1, wherein the metal lattice is selected from the group consisting of tantalum and tantalum alloys.

5. A hydrogen electrode for a fuel cell, comprising a tubular member having two open ends, one open end being capable of being connected to a source of hydrogen, a foil of metal having a multitude of crevices of molecular dimensions capable of dissolving the hydrogen at temperatures not exceeding room temperature, said foil being mounted over and closing the other tube end, and a dissimilar metallic hydrogenation catalyst layer in intimate contact with the metal foil in the interior of the tube, said catalyst layer defining a multitude of crevices of molecular size, the catalyst of said layer being selected from the group consisting of uranium hydride, titanium hydride, thorium hydride, cerium hydride, and zirconium hydride and the metal of said lattice being selected from the group consisting of tantalum, tantalum alloys, palladium and palladium-silver alloys.

6. A system for separating hydrogen from a gaseous mixture containing hydrogen, comprising a continuous metal lattice wall capable of dissolving the hydrogen at temperatures not exceeding room temperature, a dissimilar metal hydrogenation catalyst layer for diffusing the hydrogen through the layer into the metal lattice, the latter being in intimate contact with at least one surface of the wall and defining a multitude of crevices of molecular size, the catalyst of said layer being selected from the group consisting of uranium hydride, titanium hydride, thorium hydride, cerium hydride, and zirconium hydride and the metal of said lattice being selected from the group consisting of tantalum, tantalum alloys, palladium and palladium-silver alloys, and a source of said gaseous mixture supplying the mixture to said one surface.

7. A fuel cell comprising an electrode designed for the electrochemical utilization of gaseous hydrogen, said electrode comprising a metallic body of a heavy metal lattice capable of absorbing and diffusing the hydrogen, and at least a large portion of one side of said body being in intimate contact with a dissimilar metal hydrogenation catalyst layer, consisting of a metal hydride, the catalyst of said layer being selected from the group consisting of uranium hydride, titanium hydride, thorium hydride, cerium hydride, and zirconium hydride and the metal of said lattice being selected from the group consisting of tantalum, tantalum alloys, palladium and palladium-silver alloys, and a conduit delivering the gaseous hydrogen to said one side of the metallic body.

8. A system for separating hydrogen by electrolysis comprising a continuous metal lattice wall cathode capable of dissolving the evolved hydrogen at temperatures not exceeding room temperatures and a dissimilar metal hydrogenation catalyst layer in intimate contact with said continuous metal lattice, the catalyst of said layer being selected from the group consisting of uranium hydride, titanium hydride, thorium hydride, cerium hydride, and zirconium hydride and the metal of said lattice being selected from the group consisting of tantalum, tantalum alloys, palladium and palladium-silver alloys.

9. A process for the recovery of hydrogen from a gaseous mixture comprising the steps of contacting such gaseous mixture with a first side of a metallic film selected from the group consisting of tantalum, palladium, and silver-palladium alloys, said first side being coated with a dissimilar metal hydride selected from the group consisting or uranium, titanium, zirconium, thorium, and cerium hydrides; permeating the hydrogen through said metallic film; and removing such permeated hydrogen from the opposite side of said metallic film.

10. A metallic body having an imperforate metal surface layer defining a multitude of crevices of molecular dimension permeable to hydrogen said imperforate metal surface layer being in intimate contact with a dissimilar metal hydrogenation catalyst layer which defines a multitude of crevices of molecular dimension, the catalyst of said catalyst layer being selected from the group consisting of: uranium hydride, titanium hydride, thorium hydride, cerium hydride, and zirconium hydride and the metal of said imperforate metal surface layer being selected from the group consisting of tantalum, tantalum alloys, palladium and palladium-silver alloys.

* * * * *